United States Patent [19]

Ito et al.

[11] Patent Number: 5,548,047

[45] Date of Patent: Aug. 20, 1996

[54] PROCESS FOR THE PRODUCTION OF HIGHLY WATER ABSORPTIVE POLYMERS

[75] Inventors: Kiichi Ito; Shuhei Yada, both of Yokkaichi; Miho Oomori, Hokkaichi; Toshiko Nakamura, Yokkaichi, all of Japan

[73] Assignee: Mitsubishi Chemical Corporation, Tokyo, Japan

[21] Appl. No.: 442,099

[22] Filed: May 16, 1995

Related U.S. Application Data

[63] Continuation of Ser. No. 910,875, Jul. 9, 1992, abandoned.

[30] Foreign Application Priority Data

Jul. 11, 1991 [JP] Japan .................................... 3-171447

[51] Int. Cl.$^6$ ..................................................... C08F 30/04
[52] U.S. Cl. ........................ 526/240; 526/312; 526/317.1
[58] Field of Search .................................... 526/240, 312, 526/317.1

[56] References Cited

U.S. PATENT DOCUMENTS

| | | | |
|---|---|---|---|
| 4,093,776 | 6/1978 | Aoki et al. | 526/207 |
| 4,340,706 | 7/1982 | Obayashi et al. | 526/207 |
| 4,367,323 | 1/1983 | Kitamura et al. | 526/201 |
| 4,698,404 | 10/1987 | Cramm et al. | 526/240 |
| 4,727,097 | 2/1988 | Kobayashi et al. | |
| 4,880,888 | 11/1989 | Obayashi et al. | 526/240 |

FOREIGN PATENT DOCUMENTS

| | | | |
|---|---|---|---|
| 0176664 | 4/1986 | European Pat. Off. | 526/240 |
| 233014 | 8/1987 | European Pat. Off. | |
| 61-43606 | 3/1986 | Japan | 526/240 |
| 61-209201 | 9/1986 | Japan | 526/240 |
| 3195713 | 8/1991 | Japan | 526/240 |
| 2242684 | 10/1991 | United Kingdom | 526/240 |

*Primary Examiner*—Joseph L. Schofer
*Assistant Examiner*—N. Sarofim
*Attorney, Agent, or Firm*—Armstrong, Westerman, Hattori, McLeland & Naughton

[57] ABSTRACT

A process for producing a highly water absorptive polymer comprising the steps of subjecting a water-soluble ethylenically unsaturated monomer comprising as the main component acrylic acid and/or an alkali metal or ammonium salt thereof, and optionally containing a crosslinking agent to a water-in-oil type of reverse-phase polymerization in the presence of water, a water-soluble radical polymerization initiator, a dispersant and a hydrophobic hydrocarbon solvent to form a slurry of water-containing particles of a highly water absorptive polymer in the solvent, adding a polymerizable monomer to the slurry, and polymerizing the polymerizable monomer to obtain agglomerates of the particles of the highly water absorptive polymer.

8 Claims, No Drawings

PROCESS FOR THE PRODUCTION OF HIGHLY WATER ABSORPTIVE POLYMERS

This application is a continuation of application Ser. No. 07/910,875 filed Jul. 9, 1992, now abandoned.

BACKGROUND OF THE INVENTION

1. Field of the Invention

This invention relates to a process for producing a highly water absorptive polymer, and more particularly to a process for producing a highly water absorptive polymer in the form of agglomerated particles having a large particle size.

The agglomerated particles of the highly water absorptive polymer obtained by the process of the present invention are extremely large in diameter, and are excellent in coherence. Therefore, the polymer of the invention can be advantageously used for sanitary goods such as paper diapers and sanitary napkins; for various agents employed in the horticultural and agricultural fields, such as soil conditioners and water-retaining agents; and for materials used in the fields of civil engineering and construction.

2. Background Art

In recent years, highly water absorptive polymers have been widely utilized not only for sanitary goods such as paper diapers and sanitary napkins but also for materials used in industrial fields as well as in horticultural and agricultural fields such as water-holding agents, dropwise condensation preventing materials, freshness preserving materials and dehydrating materials. Under these circumstances, a variety of highly water absorptive polymers have been proposed up to date.

Examples of conventionally known highly water absorptive polymers include a hydrolyzate of a graft copolymer of starch and acrylonitrile, carboxymethyl cellulose, polyacrylic acid (salt), a copolymer of acrylic acid (salt) and vinyl alcohol and polyethylene oxide.

However, none of the conventional highly water absorptive polymers are satisfactory, especially in the size of polymer particles. In particular, polymers obtained by reverse-phase suspension polymerization have various problems. For instance, in the case where an alkali metal salt of acrylic acid or the like is polymerized by means of a water-in-oil type of reverse-phase suspension polymerization using, as a dispersant, a sorbitan fatty acid ester having an HLB of 3 to 6 as described in Japanese Patent Publication No. 54-30710, a nonionic surfactant having an HLB of 6 to 9 as described in Japanese Patent Kokai Publication No. 57-167302, or a surfactant having an HLB of 8 to 12 as described in Japanese Patent Publication No. 60-25045, only a highly water absorptive polymer having a small particle size of approximately 10 to 100 μm can be obtained.

On the other hand, when an acrylic monomer is polymerized by the method disclosed in Japanese Patent Publication No. 63-36321 or 63-36322, using as a dispersant a lipophilic polymer containing a carboxyl group, polymer particles of a size of several hundreds microns can be produced. However, because of a high affinity between the dispersant and the acrylic monomer, polymer particles tend to aggregate excessively in the course of polymerization reaction. Thus, there is a considerable likelihood of formation of a large mass of polymer particles.

Japanese Patent Publication No. 1-17482 and Japanese Patent Kokai Publication No. 57-158210 disclose methods for preparing a highly water absorptive polymer having a large particle diameter, in which an oil-soluble cellulose ester or ether is used as a dispersant. However, these methods have the drawback that the dispersant remaining in the polymer melts upon drying of the polymer. As a result, the polymer particles tend to adhere to one another or to stick to the inner wall of a vessel.

When polymerization is conducted in accordance with the method disclosed in Japanese Patent Kokai Publication No. 62-172006, using as a dispersant a polyglycerine fatty acid ester with an HLB of 2 to 16, a polymer having a large particle size can be obtained. However, the operational conditions for stably producing such a polymer is extremely limited. When the polymerization is carried out under the conditions outside of the limited range, bulk polymerization tends to take place. For this reason, the above method is not advantageous when stable industrial production is taken into consideration.

In the case where polymerization is conducted in the presence of both a dispersant and hydroxyethyl cellulose as disclosed in Japanese Patent Kokai Publications Nos. 56-76419, 62-95307 and 62-95308, a polymer having a large particle size, which is free from the problems of adhesion between the polymer particles and of sticking of the polymer to a vessel, can be obtained. It is however difficult to dissolve the hydroxyethyl cellulose in the monomer, and the use of a special apparatus is required to uniformly dissolve the hydroxyethyl cellulose in the monomer.

As described above, all of the conventional methods for preparing large primary particles of highly water absorptive polymers have various problems.

As an alternative to the above described methods, there has been proposed a method in which primary particles of a highly water absorptive polymer are agglomerated using as a binder water or polyvinyl alcohol.

However, when this method is effected by using water as a binder, the primary particles are agglomerated with an extremely low cohesive force. The agglomerated particles are therefore easily disintegrated upon ordinary transportation or handling. On the other hand, when polyvinyl alcohol is used as a binder, the coherence of agglomerated particles can be improved. However, in this case, it is necessary to use a large amount of polyvinyl alcohol and also to employ a special apparatus, so that the production cost is increased. This method is thus not satisfactory.

Further, Japanese Patent Kokai Publication No. 1-126314 discloses a method in which a monomer component containing a polymerization initiator and a crosslinking agent in larger amounts than those used for preparing a water absorptive polymer (base polymer) is added to and immersed in the water absorptive polymer and is polymerized to make the crosslinking density in the vicinity of the surface of the water absorptive polymer higher than that inside the polymer, thereby improving the water absorption rate of the polymer. However, when this method is applied, the cohesion between the particles of the base polymer is extremely low because the monomer component to be immersed in the polymer contains a polymerization initiator and its amount is larger than that used for preparing the base polymer.

It is therefore a primary object of the present invention to provide a process for producing agglomerated particles of a highly water absorptive polymer, which are very large in size and excellent in cohesion, stably and at low cost.

SUMMARY OF THE INVENTION

In order to solve the above problems in the prior art, the inventors of the present invention have made intensive studies. As a result, it was found that by adding a polymerizable monomer to a slurry of water-containing particles of a highly water absorptive polymer in a solvent, which is obtained by polymerizing a water-soluble ethylenically unsaturated monomer comprising as the main component an acrylic acid type monomer by means of a water-in-oil type of reverse-phase suspension polymerization, without adding thereto a polymerization initiator, and then polymerizing the polymerizable monomer, the particles of the highly water absorptive polymer are agglomerated with an extremely high efficiency, and agglomerates having a large particle size of 200 to 5000 μm, being excellent in coherence can be readily obtained. The present invention has been accomplished on the basis of the above finding.

Thus, the present invention provides a process for producing a highly water absorptive polymer comprising the steps of subjecting a water-soluble ethylenically unsaturated monomer comprising as the main component acrylic acid and/or an alkali metal or ammonium salt thereof, and optionally containing a crosslinking agent to a water-in-oil type of reverse-phase suspension polymerization in the presence of water, a water-soluble radical polymerization initiator, a dispersant and a hydrophobic hydrocarbon solvent to form a slurry of water-containing particles of a highly water absorptive polymer in the solvent, adding a polymerizable monomer to the slurry, and polymerizing the polymerizable monomer to obtain agglomerates of the particles of the highly water absorptive polymer.

The characteristic effects or advantages according to the present invention are as follows:

(i) The polymerizable monomer which is added to the slurry obtained by the reverse-phase suspension polymerization is easily polymerized without adding a polymerization initiator to the slurry; and (ii) concomitantly with the polymerization of the polymerizable monomer, the beadlike particles of the highly water absorptive polymer are easily agglomerated, and agglomerates which are excellent in coherence and which have a large particle size can be readily obtained.

The effect mentioned in (i) above is considered totally unexpected from the known concept of polymerization. The effect mentioned above in item (ii) is also considered quite unexpected.

According to the present invention, agglomerated particles of a highly water absorptive polymer which have a large average particle diameter and which are excellent in coherence can be obtained without decreasing the water absorption of the polymer.

DETAILED DESCRIPTION OF THE INVENTION

Water-Soluble Ethylenically Unsaturated Monomer

The water-soluble ethylenically unsaturated monomer for use in the present invention comprises as the main component acrylic acid and/or an alkali metal or ammonium salt thereof (hereinafter may be collectively referred to as an "acrylic monomer"). The term "as the main component" herein means that the water-soluble ethylenically unsaturated monomer comprises 80% by weight or more of the acrylic monomer. A preferable acrylic monomer is a partially neutralized salt of acrylic acid in which 20 mol % or more, preferably 50 mol % or more of the total carboxyl groups is neutralized into the alkali metal or ammonium salt. When an acrylic monomer with a degree of neutralization of less than 20 mol % is used, the finally obtainable polymer has poor water absorption properties and the gelled polymer swollen with water has a low strength. The upper limit of the degree of neutralization may be approximately 90 mol %. The alkali metal salt herein refers to a salt obtained by neutralizing the carboxyl groups contained in acrylic acid with an alkali metal hydroxide such as sodium hydroxide, potassium hydroxide or lithium hydroxide. A salt obtained by neutralizing acrylic acid with sodium hydroxide is particularly preferred when the properties of the resulting highly water absorptive polymer and the production cost are taken into consideration.

The water-soluble ethylenically unsaturated monomer may further comprise as a minor component other monomer(s) copolymerizable with the main component, such as methacrylic acid (salt), itaconic acid (salt), acrylamide, 2-acrylamide-2-methylpropanesulfonic acid (salt), 2-(meth)acryloylethanesulfonic acid (salt) and 2-hydroxyethyl-(meth)acrylate. The term "(meth)acryloyl" herein refers to both acryloyl and methacryloyl, and the term "(meth)acrylate" refers to both acrylate and methacrylate.

In the present invention, the concentration of the monomer in aqueous monomer solution to be subjected to polymerization is generally from 20% by weight, preferably from 30% by weight, to the saturation concentration.

A crosslinking agent may also be used along with the above-described acrylic monomer. A water-soluble compound which contains in its molecule two or more polymerizable unsaturated groups and which is copolymerizable with the acrylic monomer is generally used as the crosslinking agent. Preferable examples of such crosslinking agents include bisacrylamides such as N,N'-methylenebisacrylamide and N,N'-methylenebismethacrylamide, and long-chain diacrylates such as ethylene glycol di(meth)acrylate and polyethylene glycol di(meth)acrylate.

The suitable amount of the crosslinking agent used is about 0.001 to 0.5% by weight, preferably 0.005 to 0.3% by weight based on the aqueous monomer solution.

Radical Polymerization Initiator

A radical polymerization initiator is generally used in the process of the present invention. A water-soluble radical polymerization initiator, for instance, a persulfate such as potassium persulfate or ammonium persulfate, or an azo initiator such as 2,2'-azobis-(2-amidinopropane)hydrochloride is preferably used as the radical polymerization initiator. It is possible to use two or more of the above aqueous radical initiators in combination. Furthermore, a redox-type initiator consisting of the above radical initiator and a reducing compound such as a sulfite or an amine can also be used as the polymerization initiator. The suitable amount of the polymerization initiator used is, in general, approximately 0.001 to 5.0% by weight, preferably 0.01 to 1.0% by weight based on the aqueous monomer solution.

Dispersant

In general, a proper dispersant is used when a water-in-oil type of dispersion system is formed by dispersing an aqueous solution containing an acrylic monomer in a hydrophobic solvent. This applies to the process of the present invention.

In the present invention, a nonionic surfactant having an HLB of 2 to 7 is preferably used. Moreover, a surfactant which is solid at room temperature is preferred. By the use of such a surfactant, polymer particles can be prevented from adhering to one another into the formation of a large mass. Examples of the nonionic surfactants usable in the present invention include sorbitan fatty acid esters and sucrose fatty acid esters. Of these, sorbitan monostearate is particularly preferred.

The amount of the nonionic surfactant used is generally 0.1 to 10% by weight, preferably 0.5 to 5% by weight based on the ethylenically unsaturated monomer. When the amount of the nonionic surfactant used is less than 0.1% by weight, a sufficient dispersing effect cannot be obtained and bulk polymerization is likely to take place. As a result, beadlike polymer particles cannot be obtained. On the other hand, when the amount of the nonionic surfactant used is more than 10% by weight, the polymer particles tend to adhere to one another upon drying.

Hydrophobic Hydrocarbon Solvent

As the hydrophobic hydrocarbon solvent for use in the present invention, use may be made of any known solvent conventionally used for reverse-phase suspension polymerization. Preferable examples of hydrophobic hydrocarbon solvents employable in the present invention include (a) aliphatic hydrocarbons such as n-pentane, n-hexane, n-heptane and n-octane, and (b) alicyclic hydrocarbons such as cyclohexane, cyclooctane and methylcyclohexane. Of these solvents, cyclohexane is particularly preferred.

The amount of the hydrophobic hydrocarbon solvent used is generally 0.5 to 10 times, preferably 1 to 5 times the weight of the ethylenically unsaturated monomer.

The use of the hydrophobic hydrocarbon solvent in an amount of less than 0.5 times the weight of the monomer is not preferred since a water-in-oil type of suspension cannot be stably obtained. On the other hand, when the amount of the solvent used is more than 10 times, the volumetric efficiency of the apparatus employed is decreased.

Polymerization, Agglomeration of Particles and Polymerizable Monomer

The above-described water-soluble ethylenically unsaturated monomer is subjected to a water-in-oil type of reverse-phase suspension polymerization in the presence of the above water-soluble radical polymerization initiator, water, dispersant and hydrophobic hydrocarbon solvent. The polymerization temperature varies mainly depending on the type of the initiator used, but it is generally 20° to 150° C., preferably 30° to 100° C. The polymerization time is, in general, 5 minutes to 6 hours, preferably 30 minutes to 3 hours.

A water-soluble chain transfer agent such as a thiol, a thiol acid, a secondary alcohol, an amine or a hypophosphite may be used in the above polymerization. After the polymerization is completed, a slurry of water-swollen beadlike particles of a highly water absorptive polymer in the oily medium is obtained.

To this slurry are added, according to the present invention, one or more polymerizable monomers selected from acrylic acid, an alkali metal salt of acrylic acid, an ammonium salt of acrylic acid, methacrylic acid, methyl methacrylate, 2-hydroxyethyl acrylate, 2-hydroxyethyl methacrylate, polyethylene glycol diacrylate (molecular weight of the polyethylene glycol moiety: approximately 400 to 600), polyethylene glycol dimethacrylate (molecular weight of the polyethylene glycol moiety: approximately 400 to 600), N,N'-methylenebisacrylamide and N,N'-methylenebismethacrylamide. The polymerizable monomer added to the slurry is then polymerized while stirring. As described previously, it is unnecessary to add any polymerization initiator to the reaction system at this stage. The polymerization proceeds relatively smoothly although it depends on the type of the polymerizable monomer added, and the beadlike particles of the above obtained highly water absorptive polymer agglomerate efficiently to give agglomerates having a proper particle size.

In the present invention, acrylic acid, methacrylic acid, methyl methacrylate, 2-hydroxyethyl methacrylate and polyethylene glycol diacrylate are particularly preferred as the polymerizable monomer to be added to the slurry. The amount of the polymerizable monomer used varies depending on the type thereof. However, it is, in general, 0.5 to 50 parts by weight, preferably 1 to 35 parts by weight for 100 parts by weight of the ethylenically unsaturated monomer used for the principal or main polymerization. As well as the stirring rate upon the polymerization of the polymerizable monomer, the amount of the polymerizable monomer used is a very important factor affecting the particle size of the finally obtainable agglomerates. The particle size becomes larger as the amount of the polymerizable monomer used is increased. The polymerization temperature is generally 20° to 100° C., preferably 30° to 80° C., and the polymerization time is generally 10 minutes to 5 hours, preferably 30 minutes to 3 hours.

The agglomerates thus obtained are dehydrated through azeotropy of water and the hydrophobic hydrocarbon solvent, and then, if necessary, subjected to a surface treatment with polyglycidyl ether, a silane coupling agent or the like. Thereafter, the agglomerates are dried, pulverized and classified to obtain a final product.

The present invention will now be explained more specifically referring to Examples and Comparative Example. However, the following examples should not be construed as limiting the present invention. In the examples, the properties of the highly water absorptive polymers obtained were determined by the following methods.

(1) Artificial Urine Absorption

Accurately weigh approximately 0.5 g of a highly water absorptive polymer. Place the polymer in a 250-mesh nylon sack (size: 20 cm×10 cm) and immerse the nylon sack in 500 cc of artificial urine for one hour. Withdraw the nylon sack containing the swollen polymer from the artificial urine, allow it to stand for 15 minutes for draining, and weigh it. Calculate the artificial urine absorption of the polymer by the following equation by making a blank correction:

$$\text{Artificial urine absorption (g/g)} = \frac{\text{Weight of swollen gel (g)}}{\text{Weight of charged polymer (g)}}$$

(2) Average Particle Diameter

Assemble ASTM standard sieves of 8 mesh, 12 mesh, 20 mesh, 40 mesh, 60 mesh, 80 mesh, 100 mesh, 150 mesh and 200 mesh in sequence from the top of the stack. Place a pan at the bottom. Place approximately 50 g of a highly water absorptive polymer on the uppermost sieve. Place the stack in a ro-tap-type automatic sieve shaker, and operate the shaker for one minute. Obtain the net weight of the polymer retained on each sieve. Calculate the percentage of the polymer retained on each sieve by dividing the net weight by the total weight of the polymer and multiplying by 100. Plot particle diameter in abscissa (logarithmic scale) and cumulative undersize (mass base) in ordinate (probability scale). Read the particle diameter at a cumulative undersize of 50% to determine the average particle diameter of the polymer.

(3) Coherence of Agglomerates

Rub the agglomerated particles of a highly water absorptive polymer with fingers. Observe the agglomerates whether or not they are disintegrated easily, and evaluate by the following standard:
 ⊚: Not disintegrated at all, acceptable
 ◯: Slightly disintegrated, acceptable
 x: Easily disintegrated, unacceptable Example 1

121.2 g of cyclohexane was placed in a 500-ml four-necked round-bottomed flask equipped with a stirrer, a reflux condenser, a thermometer and a nitrogen gas feed pipe. After 0.9 g of sorbitan monostearate was added to the cyclohexane and dissolved therein, nitrogen gas was blown into the mixture to expel dissolved oxygen.

Separately, a mixture of 45 g of acrylic acid and 6.4 g of water was placed in 300-ml conical beaker. To this mixture was added 70.0 g of a 25% aqueous sodium hydroxide solution while cooling with ice, thereby neutralizing 70% of carboxyl groups in the acrylic acid. In this case, the monomer concentration in the aqueous solution after the neutralization amounts to 45% by weight. Subsequently, 0.033 g of N,N'-methylenebisacrylamide as a crosslinking agent, 0.0546 g of sodium hypophosphite as a water-soluble chain transfer agent and 0.0312 g of potassium persulfate as a polymerization initiator were added to the above monomer solution and dissolved therein. Nitrogen gas was then blown into the mixture to expel the dissolved oxygen.

The content of the 300-ml conical beaker was added to the content of the 500-ml four-necked round-bottomed flask. The flask was heated on an oil bath to raise the internal temperature of the flask while stirring and bubbling the mixture with nitrogen gas. Polymerization was carried out for 2 hours at 65°–70° C. for 2 hours while stirring at 250 rpm. After the reaction was completed, a slurry of water-swollen particles of a highly water absorptive polymer in the cyclohexane was obtained. To this slurry was gradually added 5.45 g (10% by weight of the acrylic monomer used for the principal or main polymerization) of acrylic acid as a polymerizable monomer while maintaining the temperature of the slurry at 60° C. and stirring at 250 rpm thereby to carry out reaction for 1 hour.

Subsequently, the temperature of the oil bath was raised to dehydrate the reaction mixture through azeotropy of water and cyclohexane, whereby the water content of the polymer was reduced to 25% by weight.

When the stirring was stopped, wet agglomerated particles of the polymer settled down on the bottom of the flask, so that they were easily separated from the cyclohexane phase by decantation. The wet polymer separated Has transferred into a vacuum drier and heated to a temperature of 80° to 90° C. The cyclohexane and water were thus removed from the polymer, and dried agglomerates of a highly water absorptive polymer were finally obtained.

Example 2

The procedure of Example 1 was repeated except that 5.45 g of the acrylic acid added as the polymerizable monomer to the slurry obtained by the reverse-phase suspension polymerization was replaced by 4.5 g (8.2% by weight of the acrylic monomer used for the main polymerization) of methyl methacrylate, whereby dried large agglomerates of a highly water absorptive polymer were finally obtained.

Example 3

The procedure of Example 1 was repeated except that 5.45 g of the acrylic acid added as the polymerizable monomer to the slurry obtained by the reverse-phase suspension polymerization was replaced by 2.25 g (4.1% by weight of the acrylic monomer used for the main polymerization) of 2-hydroxyethyl methacrylate, whereby dried large agglomerates of a highly water absorptive polymer were finally obtained.

Example 4

The procedure of Example 1 was repeated except that 5.45 g of the acrylic acid added as the polymerizable monomer to the slurry obtained by the reverse-phase suspension polymerization was replaced by 2.25 g (4.1% by weight of the acrylic monomer used for the main polymerization) of 2-hydroxyethyl acrylate, whereby dried large agglomerates of a highly water absorptive polymer were finally obtained.

Example 5

The procedure of Example 1 was repeated except that 5.45 g of the acrylic acid added as the polymerizable monomer to the slurry obtained by the reverse-phase suspension polymerization was replaced by a mixture of 2.25 g (4.1% by weight of the acrylic monomer used for the main polymerization) of polyethylene glycol diacrylate ("PEG-400") and 6.75 g (12.4% by weight of the acrylic monomer used for the main polymerization) of acrylic acid, whereby dried agglomerates of a highly water absorptive polymer were finally obtained.

Example 6

The procedure of Example 1 was repeated except that 5.45 g of the acrylic acid added as the polymerizable monomer to the slurry obtained by the reverse-phase suspension polymerization was replaced by 4.5 g (8.2% by weight of the acrylic monomer used for the main polymerization) of methacrylic acid, whereby dried large agglomerates of a highly water absorptive polymer were finally obtained.

Example 7

The procedure of Example 1 was repeated except that the amount of the acrylic acid added to the slurry obtained by the reverse-phase suspension polymerization was changed to 9 g (16.5% by weight of the acrylic monomer used for the main polymerization), whereby dried agglomerates of a highly water absorptive polymer were finally obtained.

Example 8

The procedure of Example 1 was repeated except that the amount of the acrylic acid added to the slurry obtained by the reverse-phase suspension polymerization was changed to 13.5 g (24.7% by weight of the acrylic monomer used for the main polymerization), whereby dried large agglomerates of a highly water absorptive polymer were finally obtained.

Comparative Example 1

The procedure of Example 1 was repeated without adding any polymerizable monomer to the slurry obtained by the reverse-phase suspension polymerization, whereby a dried powder of a highly water absorptive polymer was finally obtained.

The highly water absorptive polymers obtained in Examples 1 to 8 and Comparative Example 1 were evaluated in terms of (1) the artificial urine absorption, (2) the average particle diameter and (3) the coherence of the agglomerates in accordance with the above-mentioned methods. The results are shown in Table 1.

TABLE 1

| Example/ Comparative Example | Artificial Urine Absorption (g/g polymer) | Average Particle Diameter (μm) | Coherence of Agglomerates |
|---|---|---|---|
| Example 1 | 42.5 | 210 | ○ |
| Example 2 | 39.2 | 1621 | ⊚ |
| Example 3 | 43.3 | 3062 | ⊚ |
| Example 4 | 39.5 | 205 | ○ |
| Example 5 | 41.8 | 1717 | ⊚ |
| Example 6 | 38.0 | 1063 | ○ |
| Example 7 | 41.0 | 355 | ○ |
| Example 8 | 40.5 | 848 | ○ |
| Comparative Example 1 | 42.5 | 100 | Not agglomerated |

What is claimed is:

1. A process for producing a highly water absorptive polymer comprising the steps of:

subjecting a water-soluble ethylenically unsaturated monomer comprising as the main component acrylic acid and/or an alkali metal or ammonium salt thereof to a water-in-oil, reverse-phase suspension polymerization in the presence of water, a water-soluble radical polymerization initiator, a dispersant and a hydrophobic hydrocarbon solvent to form a slurry of water-containing particles of a highly water absorptive polymer in the solvent, adding a polymerizable monomer to said slurry, and polymerizing in said slurry the polymerizable monomer without the addition of additional polymerization initiator to obtain agglomerates of the particles of the highly water absorptive polymer.

2. The process according to claim 1, wherein the ethylenically unsaturated monomer is a sodium acrylate with a degree of neutralization of 20 to 90 mol %.

3. The process according to claim 1, wherein the dispersant is a nonionic surfactant having an HLB of 2 to 7.

4. The process according to claim 3, wherein the nonionic surfactant is sorbitan monostearate.

5. The process according to claim 1, wherein the hydrophobic hydrocarbon solvent is cyclohexane.

6. The process according to claim 1, wherein the polymerizable monomer is selected from the group consisting of acrylic acid, an alkali metal salt of acrylic acid, an ammonium salt of acrylic acid, methacrylic acid, methyl methacrylate, 2-hydroxyethyl acrylate, 2-hydroxyethyl methacrylate, polyethylene glycol diacrylate, polyethylene glycol dimethacrylate, N,N'-methylenebisacrylamide and N,N'-methylenebismethacrylamide.

7. The process according to claim 1, wherein the amount of the polymerizable monomer is 0.5 to 50 parts by weight for 100 parts by weight of the ethylenically unsaturated monomer.

8. The process according to claim 1, wherein the water-soluble ethylenically unsaturated monomer contains a crosslinking agent.

* * * * *